US008239109B2

(12) United States Patent
Dunn et al.

(10) Patent No.: US 8,239,109 B2
(45) Date of Patent: Aug. 7, 2012

(54) OUTPUT SHAFT SPEED SENSOR BASED ANTI-LOCK BRAKING SYSTEM

(75) Inventors: Daniel Dunn, Canton, MI (US); Charles Bannon, Northville, MI (US); Douglas Marsden, El Paso, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 12/023,003

(22) Filed: Jan. 30, 2008

(65) Prior Publication Data

US 2009/0192689 A1    Jul. 30, 2009

(51) Int. Cl.
*B60K 31/04* (2006.01)
*B60W 10/00* (2006.01)
*B60W 40/12* (2012.01)
*B60T 8/32* (2006.01)
*B60T 8/58* (2006.01)
*B60T 7/12* (2006.01)

(52) U.S. Cl. ........ 701/74; 701/29.1; 701/29.6; 303/138; 477/92; 180/170

(58) Field of Classification Search ................. 701/1, 29, 701/36, 70, 71, 72, 73, 74, 82, 91, 29.1, 29.6, 701/32.7; 303/121, 138, 139, 146, 147, 168–171; 477/34, 37, 77, 78, 92, 97; 180/170, 197
See application file for complete search history.

(56) References Cited

U.S. PATENT DOCUMENTS

| 5,941,613 | A  | * | 8/1999 | Tagawa ................. 303/190 |
| 6,292,741 | B1 | * | 9/2001 | Bitzer et al. ............... 701/115 |
| 6,923,514 | B1 | * | 8/2005 | Spieker et al. ............. 303/199 |
| 2002/0062460 | A1 | * | 5/2002 | Okuda ....................... 714/25 |
| 2004/0064220 | A1 | * | 4/2004 | Kobayashi ................ 701/1 |
| 2005/0049722 | A1 | * | 3/2005 | Kobayashi ................ 700/9 |
| 2007/0225873 | A1 | * | 9/2007 | Toya et al. ................ 701/1 |

* cited by examiner

*Primary Examiner* — Jack W Keith
*Assistant Examiner* — Edward Pipala
(74) *Attorney, Agent, or Firm* — Nugent & Smith, LLP; Robert Hess; Theresa O'Rourke Nugent

(57) ABSTRACT

An anti-lock braking system (ABS) calculates driven wheel speed without any sensors on the driven axle assembly. A powertrain control module (PCM) receives signals from an output shaft speed (OSS) sensor and adds the speed and axle ratio information to a control network bus. Access to the CAN bus is provided to enable calculation of the rear wheel speed based on such information so that ABS may implement anti-lock braking functionality by taking into account such information.

8 Claims, 2 Drawing Sheets

OUTPUT SHAFT SPEED SENSOR BASED ANTI-LOCK BRAKING SYSTEM

BACKGROUND OF THE INVENTION

1. Field of the Invention

The present invention relates to an anti-lock braking system that performs without a differential speed sensor (DSS) to calculate rear wheel vehicle speed, instead relying upon information from the output shaft speed (OSS) sensor.

2. Discussion of Related Art

Rear wheel speed sensors have historically been a significant source of anti-lock braking system (ABS) warranty, because of their operation in harsh operating environments, namely, exposure to high heat and accelerations of the sensor and wire harness on the axle and placement in high splash zones. Further, they become problematic because of damage from aftermarket body builders. In contrast, there is no mechanism for the ABS to be the cause of Powertrain Control Module (PCM) or OSS sensor failures. The only connection is via a high-speed controller area network (HSCAN) bus, which may be a conventional mini-network to exchange data between computers at a high transmission rate. Indeed, OSS-based ABS diagnostic algorithms are more tolerant of some intermittent failures than conventional 3-sensor ABS.

The inventors were trying to improve reliability of the DSS and reduce the cost of an ABS system. During the investigation, the inventors determined that the DSS is actually a redundant sensor to the OSS.

It is desired to provide an anti-lock braking system that calculates rear wheel speed of a motor vehicle without relying upon any information from the DSS to do so.

SUMMARY OF THE INVENTION

One aspect of the invention relates to a control braking systems, such as an anti-lock braking system (ABS), that calculates the speed of a driven wheel without reliance on any differential speed sensor. For rear wheel drive vehicles, the driven wheel speed that is calculated would be that of the rear wheels. For front wheel drive wheels, the driven wheel speed that is calculated would be that of the front wheels.

A sensor signal reading module, such as a powertrain command module (PCM), receives signals from an output shaft speed (OSS) sensor pertaining to rotational speed and axle information. Such PCM internal OSS rotational speed and axle ratio information is added to a message list of a controller area network (CAN), which is a mini-network for exchanging data between computers. A control braking system module, such as an ABS module, accesses the CAN message list to retrieve such information as necessary to calculate the rear wheel speed. Based on such a calculation and together with information provided from front wheel speed sensors, the control braking system module implements anti-lock braking functionality.

BRIEF DESCRIPTION OF THE DRAWING

For a better understanding of the present invention, reference is made to the following description and accompanying drawing, while the scope of the invention is set forth in the appended claims.

DETAILED DESCRIPTION OF THE PREFERRED EMBODIMENT

Figure 1:
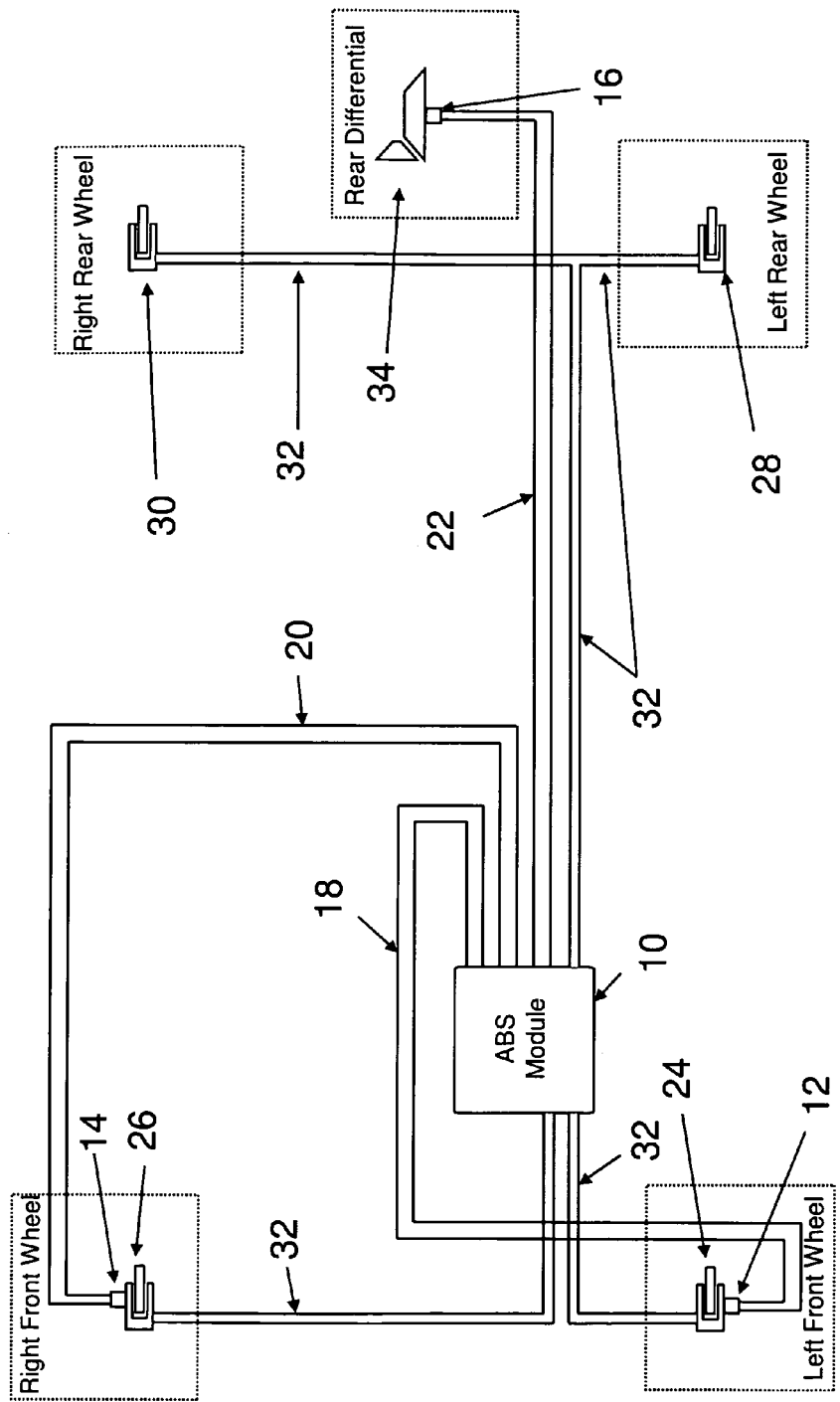
FIG. 1 shows a schematic diagram of a conventional three channel ABS system that relies upon a differential speed sensor (DSS) to provide rear wheel speed information for implementing anti-lock braking (ABS) functions.

The inventors use the output shaft speed (OSS) signal, in lieu of the differential speed sensor (DSS) signal, to determine the rear wheel speeds, hence eliminating the need for the DSS. The OSS signal conventionally is calculated and used internally by the vehicle PCM (Powertrain Control Module). The inventors modified the CAN message list to allow this signal to also be sent to the ABS module by the PCM. This raw signal is filtered and then used by the ABS module for the rear wheel speeds. The invention makes use of this OSS signal/sensor instead of a dedicated rear wheel speed sensor such as the DSS, and allows for the elimination of the cost/assembly/wiring/components of the DSS.

Such a modified OSS signal/sensor enhances ABS reliability over the conventional ABS system that relies on the DSS to provide rear wheel speed information. Indeed, only the loss of the CAN bus leads to the loss of ABS. There is no longer loss of the ABS due to failure with the DSS. Further, the invention reduces the cost for providing ABS functionality over the conventional ABS system that used the DSS. Such a modification reduces labor and failures for axle suppliers and final assembly plant manufacture of vehicles equipped with ABS functionality. Further, such a modification reduces complexity in service parts.

The present inventors implemented ABS diagnostic strategies that compensate for reduced sensor input (with no DSS present), but no ABS performance degradation or diagnostic problems were detected. The inventors faced at least seven significant technical challenges to realize the invention:

(1) Lost sensor electronic monitoring by ABS required new plausibility diagnostics. Electronic monitoring of the OSS sensor is performed by the PCM. Existence of an electronic fault is transmitted to the ABS module via the vehicle CAN. In the absence of an OSS sensor electronic fault, the PCM does not determine the validity of the signal. The ABS module must perform plausibility diagnostics to determine the validity of the OSS signal received from the PCM.

(2) Reduced signal resolution, discretely sampled, was only available at low update rate and with a time delay. The signal resolution of the DSS, determined by the number of teeth on the tone ring in the differential, is 120 pulses per wheel revolution and is continuously sampled. The signal resolution of the OSS, determined by the number of teeth on the tone ring attached to the output shaft of the transmission and the final drive ratio, could be as low as 67 pulses per wheel revolution and is only sampled once per given PCM clock cycle. In addition, the OSS signal could be delayed by as much as the sum of the PCM clock cycle and the CAN OSS message period.

(3) Robustness to two transmissions with different sensor technologies and signal update rates was required. This technology is intended to be used on an ABS system that is common across multiple powertrain configurations that have 2 different transmissions, a 4-speed automatic and a 5-speed automatic, each with unique tone rings that have differing tooth counts, different OSS sensor technologies, different PCM clock cycles, and a variety of final drive ratios.

(4) The OSS sensor is remotely mounted relative to the wheel speeds being measured so there were concerns related to driveline lash & wind-up. Rotational velocities and accelerations associated with driveline lash in the final drive gear set and wind-up, torsional deflection in components upstream of the DSS, could be present in the OSS signal that are not present in the DSS signal.

(5) Degraded ABS system performance was not acceptable.

(6) An innovative diagnostic approach was needed to overcome power train signal processing constraints. The PCM calculates and transmits via CAN OSS information at a rate different than that which the ABS software executes at. As a result, OSS information may not update between consecutive execution loops of the ABS module software. Special diagnostics in the ABS module were developed to handle this situation.

(7) Industry-first application needed to be proven Implementation Ready (IR) so as not to risk successful launch of a target vehicle program.

An early concern for OSS technology was CAN bus induced signal lag and the effect on ABS control performance. Test data indicates that the CAN bus lag was minimal and readily accommodated by ABS software modifications. No degradation in braking performance was found.

The present invention requires no changes to hardware, but allows for the deletion of the DSS from the rear axle and all associated wiring. The OSS sensor is conventional, but sensor/tone ring systems with a lower signal resolution may not be compatible for use with this invention.

Software modifications to both the Powertrain Control Module (PCM) and the Anti-lock Brake System (ABS) Module are required.

Changes to conventional PCM software, which may be that as supplied by Ford Motor Company, are minor. The changes to the PCM software are those needed to add the existing PCM internal OSS rotational speed and axle ratio information to the CAN message list. As such, this information becomes accessible by the ABS module for use in determining the driven (in this case rear) wheel speeds.

Changes to conventional ABS module software are extensive. The ABS software changes were made to account for diagnostics of the CAN OSS information and reduced signal resolution discretely sampled at lower update rate and increased time delay. However once a valid driven wheel speed is calculated from the OSS information, such a calculation is directly substituted for the wheel speed calculated from the directly wired DSS information. The ABS module generates instructions to implement anti-lock braking based on such a calculation together with other sensed information such as from non-driven wheel speed sensors. No software modifications are required that would affect vehicle performance.

Such changes to the ABS module may be readily implemented based on the present disclosure by vendors familiar with conventional ABS system software that calculates rear wheel speed from DSS signals.

Turning to the drawing, FIG. 1 shows a conventional ABS system that uses the DSS. The ABS system includes the ABS module 10 that, in the case of a rear drive vehicle, receives inputs from two non-driven front wheel speed sensors 12, 14 and a differential speed sensor (DSS) 16 (for the driven rear wheels). There are respective pairs of signal lines 18, 20, 22 between the ABS module 10 and corresponding ones of the sensors 12, 14, 16. Left and right (non-driven) front wheels have brake assemblies 24, 26 and left and right (driven) rear wheels have brake assemblies 28, 30. Each of the brake assemblies 24, 26, 28, 30 has a respective brake caliper and brake disc rotor that cooperatively act to effect braking. Hydraulic lines 32 provide the necessary hydraulic fluid for the brake assemblies 24, 26, 28, 30 to effect braking.

A rear differential gear mechanism 34 permits a rear axle to turn corners with one wheel rolling faster than the other. It may have two side gears carrying the inner ends of axle shafts, meshing with two pinions mounted on a common pin located in a differential case. The case carries a ring gear driven by a pinion at the end of the drive shaft. Such an arrangement permits the drive to be carried to both wheels, but at the same time as the outer wheel on a turn overruns the differential case, the inner wheel lags by a like amount. The differential speed sensor (DSS) 16 senses rear wheel speeds at the rear differential gear mechanism 34.

Figure 2:
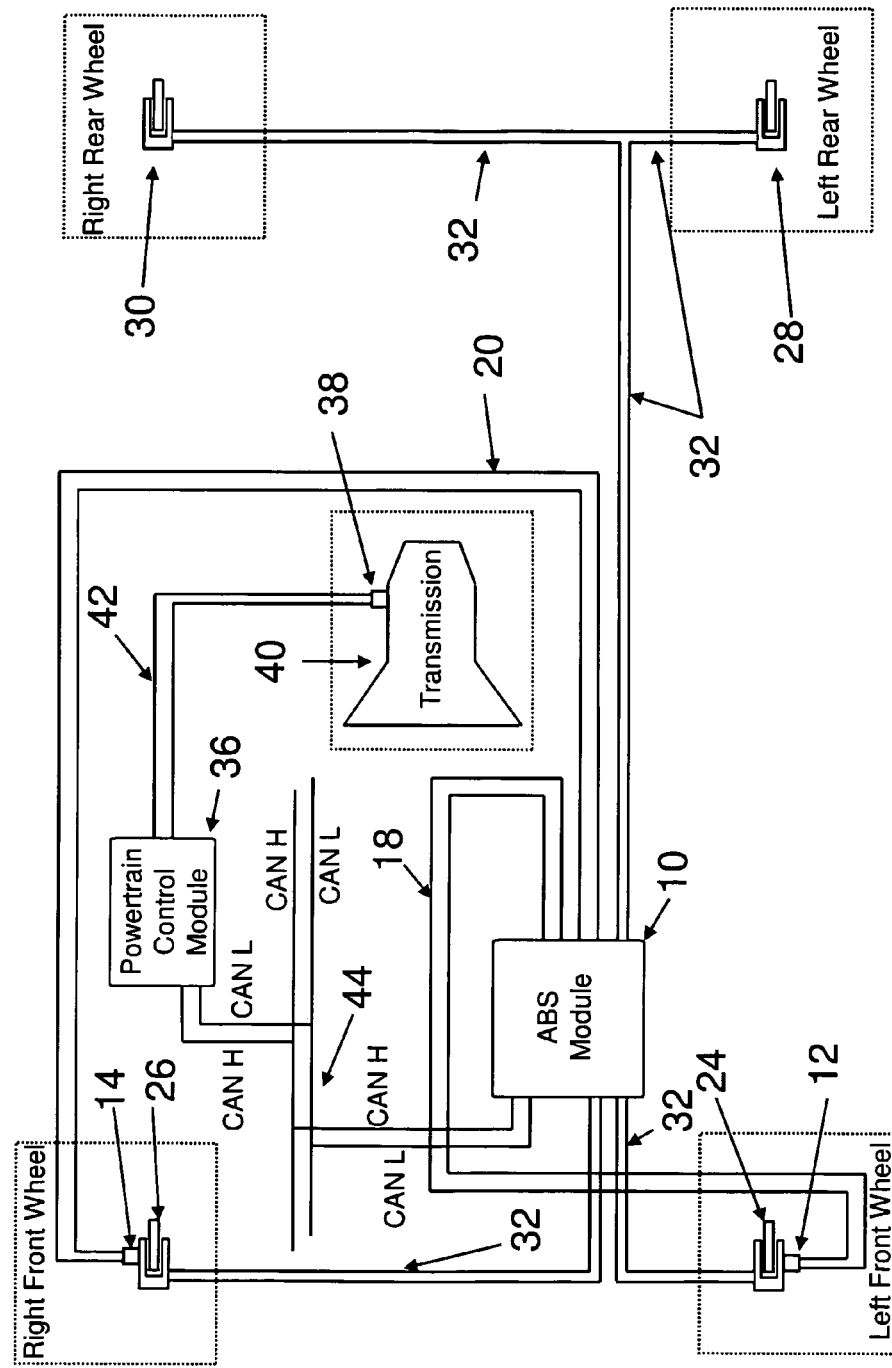
FIG. 2 shows a schematic diagram of a 3 channel ABS system in accordance with the invention that dispenses with the DSS and thus any need for its rear wheel speed information from the DSS for implementing ABS functions. Such rear wheel speed information is available instead from the output shaft speed (OSS) sensor found on automatic transmissions.

FIG. 2 shows an ABS system in accordance with the invention that dispenses with the DSS of FIG. 1 entirely. The ABS system of FIG. 2 includes the ABS module 10 that receives inputs from two front wheel speed sensors 12, 14. There are respective pairs of signal lines 18, 20 between the ABS module 10 and corresponding ones of the sensors 12, 14. Brake assemblies 24, 26 for the left and right front wheels and brake assemblies 28, 30 for the left and right (driven) rear wheels 28, 30 are also shown that run on hydraulic fluid from hydraulic lines 32.

FIG. 2 further shows the power train module (PCM) 36, which receives signals from the output shaft speed (OSS) sensor 38 at the transmission 40. Two sensor lines 42 extend between the PCM 36 and the OSS sensor 38. The PCM 36 also receives signals from the high speed CAN bus 44 via CAN L and CAN H pins or signal lines. The ABS module 10 communicates with the PCM 32 via such CAN L and CAN H pins or signal lines to convey the sensor information from the front wheel speed sensors 12, 14. The PCM 36 processes such information together with sensed information from the OSS sensor 38 regarding rear wheel speeds to implement its ABS functionality.

The present invention is intended to cover non-driven and driven wheels, such as those found in front wheel drive vehicles and rear wheel drive vehicles. Further, the present invention applies to 4-wheel drive vehicles as well, in which case the wheel speed is calculated for either or both front and rear wheels from applicable output shaft rotational speed and applicable axle ratio information.

The present invention eliminates kinematical redundant speed sensors (such as the DSS) by replacing them with a single sensor (such as that for the OSS) that could be located anywhere along the vehicle between the engine and driven wheels.

Control braking systems of any type are envisioned by the present invention, such as ABS, electronic brake distribution (EBD), traction control systems (TCS), electronic stability control systems (ESC), etc.

Any kind of sensor signal reading module are envisioned whose sensed readings may be used on CAN, such as the PCM and the automatic transmission control module (TCM). Also, the control braking system module such as the ABS could instead read the OSS and send the read sensor information to the sensor signal reading module, such as the PCM, over the CAN instead of vice versa.

While the foregoing description and drawings represent the preferred embodiments of the present invention, it will be understood that various changes and modifications may be made without departing from the scope of the present invention.

What is claimed is:

1. A device that dispenses with kinematically redundant speed sensors, comprising an anti-lock braking system (ABS) module that implements ABS functions; a single kinematical speed sensor on an automatic transmission, the single kimematical speed sensor being configured and arranged to generate output shaft rotational speed signals instead of differential speed sensor signals; a controller network bus having a message list that contains information pertaining to the output shaft rotational speed and to axle ratio, the ABS module being configured and arranged to access the message list to retrieve the information pertaining to the output shaft rotational speed and the axle ratio with which to calculate driven wheel speed for implementing the ABS functions.

2. The device of claim 1, further comprising a sensor signal reading module arranged to read the generated output shaft rotational speed signals, the sensor signal reading module being selected from a group consisting of a power train module (PCM) and an automatic transmission control module (TCM).

3. The device of claim 1, wherein the ABS module makes a calculation of the driven wheel speed of driven wheels based on the output shaft rotational speed and axle ratio information that was retrieved from the message list.

4. The device of claim 3, further comprising wheel speed sensors providing signals indicative of non-driven rotational wheel speeds that are the ABS module generating instructions to implement anti-lock braking based on the calculation and the signals from the wheel speed sensors.

5. A method that dispenses with kinematically redundant speed sensors, comprising an anti-lock braking system (ABS) module implementing ABS functions; a single kinematical speed sensor on an automatic transmission, the single kinematical module generating output shaft rotational speed signals instead of differential speed sensor signals; a controller network bus having a message list that contains information pertaining to the output shaft rotational speed and to axle ratio; the ABS module accessing the message list to retrieve the information pertaining to the output shaft rotational speed and the axle ratio with which to calculate a driven wheel speed for implementing the ABS functions.

6. The method of claim 5, further comprising selecting a sensor signal reading module from a group consisting of a power train module (PCM) and an automatic transmission control module (TCM), the sensor signal reading module reading the output shaft rotational speed signals.

7. The method of claim 5, wherein the ABS module makes a calculation of the wheel speed of driven wheels based on the output shaft rotational speed and axle ratio information that was retrieved from the message list.

8. The method of claim 7, further comprising wheel speed sensors providing signals indicative of rotational wheel speed of non-driven wheels, the ABS module generating instructions to implement anti-lock braking based upon the calculation and upon the signals from the wheel speed sensors.

* * * * *